Figure 1:
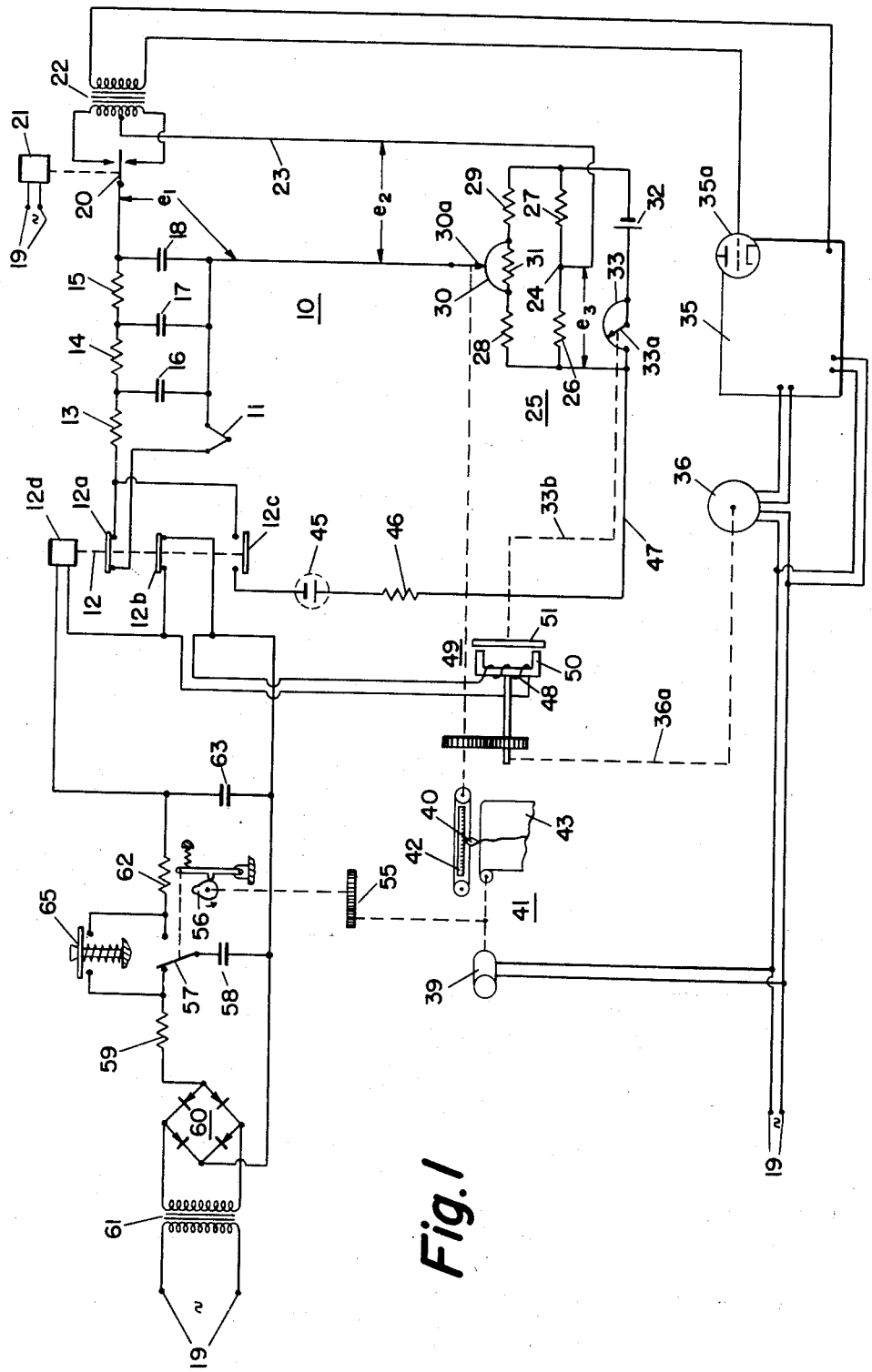

March 22, 1955   C. E. MILLER   2,704,822
STANDARDIZATION OF NULL-TYPE MEASURING SYSTEMS
Filed Feb. 5, 1954   2 Sheets-Sheet 2

United States Patent Office

2,704,822
Patented Mar. 22, 1955

2,704,822

STANDARDIZATION OF NULL-TYPE MEASURING SYSTEMS

Charles E. Miller, Glenside, Pa., assignor to Leeds and Northrup Company, Philadelphia, Pa., a corporation of Pennsylvania Application February 5, 1954, Serial No. 408,328

9 Claims. (Cl. 323—66)

This invention relates to the null-type measuring systems of the continuously operable high-speed type which require periodic standardization and has for an object the provision of a resistor-capacitor network for initiating and governing the length of the standardizing operation.

In null-type measuring systems an unknown voltage is applied to one part of a measuring circuit of a network. An opposing voltage is adjusted in the same part of the network until it is equal to the unknown voltage. A detector responds to any difference between the unknown voltage and the known opposing voltage and produces adjustment of the latter until a voltage balance is achieved. Thus, when the two voltages are equal there will be zero current flow in the detector and the measurement of the unknown voltage will take place without errors due to current flow in the measuring circuit. Such a measuring system requires that the source of the known voltage be constant. For reasons of economy or otherwise, the potentiometer network usually utilized includes a battery as the source of the known voltage. However, since battery voltages vary with temperature, and in general decrease over long periods of time, it has long been known that the measuring network must be periodically calibrated or standardized. This is done by adjustment of a rheostat in circuit with the battery for bringing to a predetermined value the current flowing to the measuring network. In systems such as shown in Ross et al. Patent 2,113,069, cams are utilized to control the switching operations for transfer of the detector from the measuring circuit to a standardizing circuit. With mechanical relays of the type shown in the Ross et al. patent, standardizing times of thirty seconds or more were necessary.

As electronic types of measuring systems were developed and improved as shown by Williams Patents 2,113,164 and 2,367,746, the speeds at which the network could be balanced and made to follow variations in the unknown voltage were greatly increased so that balancing times were but a small fraction of those previously required. For example, in a high-speed electronic type of measuring system, having a chart ten inches wide, the pen index can follow a variation from minimum to maximum on the scale in a time interval of the order of a second and less. Accordingly, the time required for calibrating may be of the order of a second or two instead of the previously required thirty seconds.

As clearly shown by Williams Patent 2,657,349 arrangements may be utilized in which both the measuring slidewire and the calibrating rheostat may contribute a velocity component to provide the needed damping of the balancing motor to prevent overshoot during the recalibrating operation.

Heretofore reliance has been placed upon mechanical systems including cams for the transfer from measuring to standardizing, such cams also being relied upon to determine the length of the standardizing operation. As the times required for standardizing have been reduced, improvements have been made in the mechanical systems one of the later improvements being disclosed in Clark Patent 2,603,096.

It is an object of the present invention to provide a system in which cams are not required to operate transfer switches and in which timing cams have been entirely dispensed with. In accordance with the present invention a capacitor during measuring operations is charged to a predetermined voltage. When ever a standardizing operation is required a switch transfers the connections of the capacitor from its chargingn source to a circuit control including a relay and a magnetically operated clutch. The relay operates transfer contacts to change the system from its measuring operation to its standardizing operation and at the same time the magnetic clutch connects the rheostat in driving relation with the motor for its adjustment to bring to a predetermined value the current flowing into the measuring or potentiometer network. The length of the standardizing operation is determined by the period during which sufficient current flows from the capacitor to maintain the relay energized and to maintain the driving connection between the rheostat and the driving motor. It has been found that a capacitor works quite satisfactorily for standardizing periods as short as a second or less and readily provides standardizing time up to three seconds or more.

Figure 2:
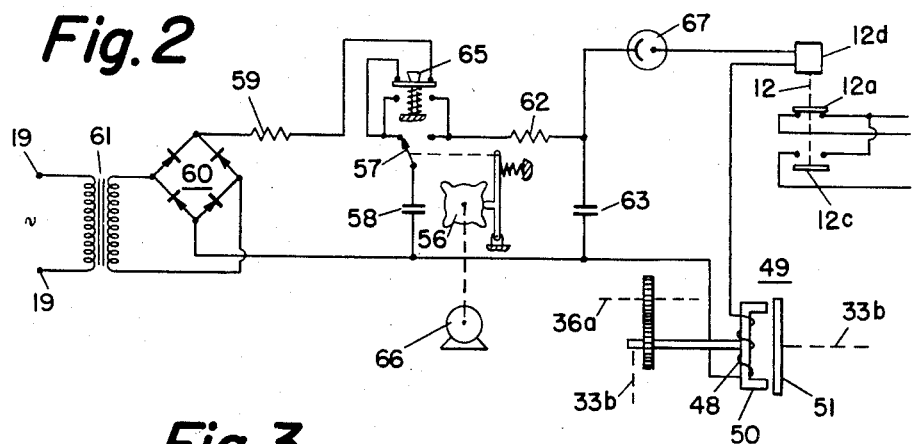
Figure 3:
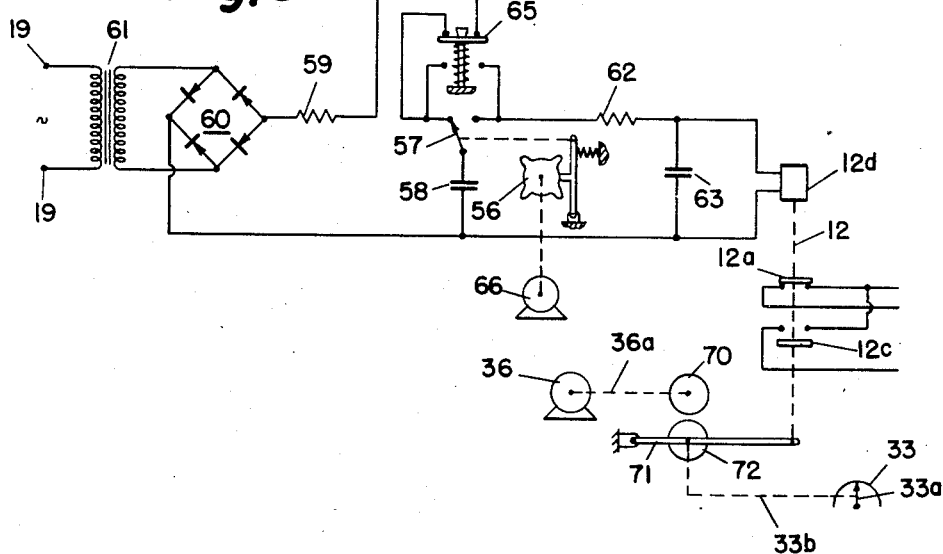

For a more detailed explanation of the invention and for further objects and advantages thereof, reference is to be had to the following description taken in conjunction with the accompanying drawings in which:

Fig. 1 diagrammatically illustrates a system embodying the invention;

Figs. 2 and 3 respectively diagrammatically illustrate further embodiments of the invention.

Referring now to Fig. 1, the invention in one form has been shown applied to a measuring network 10 for the determination of the unknown voltage representative of the magnitude of a condition. If the condition is to be measured is temperature, then a thermocouple 11 will be connected into the input circuit which includes contacts 12a of a relay 12. That circuit also includes an R-C filter network including resistors 13, 14 and 15 and capacitors 16, 17, and 18. The input circuit includes a vibrator or converter 20 which may be of the polarized type operable by a coil 21 energized from a suitable source of alternating current supply as indicated by the terminals 19 which may be at the usual commercial frequency of 60 cycles per second. The input circuit also includes a transformer 22, the stationary contacts of the converter 20 being effectively connected to the ends of the primary winding while a conductor 23 is connected to a midtap thereof. Conductor 23 extends to the midpoint 24 of a potentiometer network 25 having one parallel branch including a calibrating resistor 26 and a cold-junction compensating resistor 27. The other parallel branch includes end coils or series resistors 28 and 29 connected in series with a slidewire 30 having a shunting resistor 31 connected across its opposite terminals. The potentiometer network 25 is energized from a battery 32 by way of a rheostat 33.

The potentiometer network 25 supplies a voltage $e_2$ opposite to the input voltage $e_1$. If $e_1$ be greater or less than the voltage $e_2$, it will be seen that the vibrator or converter 20 will convert the difference voltage to an alternating current which through the secondary windings of transformer 22 will be applied to an amplifier 35 which is preferably of the type disclosed in Williams Patent 2,113,164 or 2,367,746, Figs. 13 and 13A, for the control of the energization and direction of rotation of a balancing motor 36. Thus if the input voltage $e_1$ exceeds the balancing voltage $e_2$ the balancing motor 36 will be energized for rotation in direction relatively to adjust slidewire 30 and its associated contact 30a in a direction to reduce the difference voltage or to increase $e_2$ until it is equal to $e_1$. In practice, the motor 36 adjusts $e_2$ so that it maintains it substantially equal to $e_1$ at all times and thus the position of a pen-index 40 of a recorder 41 continuously indicates on a scale 42 and records on a record chart 43 the magnitude of the condition under measurement, i. e., the temperature to which thermocouple 11 is subjected.

As explained in said Williams Patent 2,657,349 the filter network in the input circuit not only tends to eliminate stray 60 cycle alternating current from the input circuit but it also functions to introduce a velocity component to insure a damping action which prevents overshoot of the motor 36 as it relatively adjusts slidewire 30 and its contact 30a. It may be mentioned that while contact 30a is shown relatively adjustable with respect to slidewire 30 it is frequently more desirable to mount the slidewire 30 on a disk and to move the disk relative to a stationary contact.

Any change in the voltage of battery 32 will of course change the current flow through the parallel paths including the resistors 26 and 27 in series circuit relation in one path; and including the resistors 28, 29, and the slide-wire 30 with its shunting resistor 31 in series in the other path. Thus any change in current flowing through the upper parallel path will change the value of the voltage $e_2$ to the detriment of accuracy of measurement. Since changes in voltage of the battery 32 are relatively small and occur over substantial lengths of time it is only necessary to effect a standardizing operation at relatively infrequent intervals, for example, every fifteen minutes, or in some cases every hour or so.

The standardizing operation occurs as the result of the energization of the relay coil 12d which opens its contacts 12a and 12b and closes its contacts 12c. The opening of contacts 12a disconnects the thermocouple 11 from the measuring circuit 10 and the closure of contacts 12c connects into the measuring circuit 10 a standard cell 45 having in series therewith a resistor 46 having a much higher resistance than those in the potentiometer network 25. The voltage introduced into the measuring network by the standard cell 45 opposes that developed across the standardizing resistor 26 and labeled $e_3$ in Fig. 1. If $e_3$ be less or greater than the voltage of the standard cell 45 the difference voltage is converted by the vibrator 20 to an alternating current voltage which after amplification is utilized for the energization of motor 36 for adjustment of rheostat contact 33a in a direction to bring $e_3$ to a value equal to the voltage of standard cell 45. To adjust rheostat contact 33a, a coil 48 of a magnetic clutch 49 is energized to complete a driving engagement between driving member 50 and a driven member 51 which is mechanically connected as shown by the broken line 33b to the movable contact 33a. It may here be observed that the contact 33a may be and preferably is concurrently adjusted with contact 30a. Movement of contact 30a does not affect the balancing of the voltage $e_3$ against that of the standard cell 45 but it is helpful in introducing an additional damping component for high speed standardizing operations.

In accordance with the present invention the coils 12d and 48 are energized under the control of any suitable timing device, such as shown. It may include reduction gears 55 driving a timing cam 56 which periodically operates a single-pole double-throw switch 57 from its left-hand position to its right-hand position.

With the parts in the positions shown, a capacitor 58 is connected through a resistor 59 to a rectifier 60 supplied by a transformer 61 from an alternating current source of voltage as indicated by the supply terminals 19. The capacitor 58 preferably has a capacitance of the order of 200 microfarads though its capacitance may vary considerably from the exemplary value stated. As the cam 56 moves switch 57 to its right-hand position, the capacitor is connected through a resistor 62 in the series circuit which includes the coils 12d and 48. The discharge current from capacitor 58 is adequate to successively energize coils 12d and 48 for the purposes above explained and to transfer the connections from measuring to standardizing and to energize the magnetic clutch for driving the rheostat contact 33a. Preferably, a capacitor 63 is connected in parallel with coils 12d and 48 for the purpose of decreasing the rate of rise of discharge current through the coils 12d and 48.

It will readily be understood by those skilled in the art that the initial flow of current from capacitor 58 charged to its peak voltage will be at a fairly high rate to insure rapid and positive operation of the contacts of relay 12 to their "energized" positions and for operation of the magnetic clutch 49. As the peak value of discharge current is attained the current begins immediately to decrease. As soon as the current flow decreases below the "hold-in" value, the relay 12 will be deenergized and its contacts will return to their illustrated positions. Concurrently the coil 48 of the magnetic clutch will be short-circuited by contacts 12b which it will be observed are connected across the respective ends of the clutch winding.

The total time required for standardizing in general may be of the order of a second or less but it can be made to extend to more than three seconds.

With the parts in the positions as illustrated, if it is desired manually to standardize the measuring network, it is only necessary to depress the pushbutton switch 65. This closes the circuit from the output terminals of rectifier 60 through the coils 12d and 48. Standardizing takes place in the manner above described, it being only necessary to maintain the pushbutton switch 65 closed for the required length of the standardizing period, ordinarily from one to three seconds.

Whether standardizing be accomplished manually or automatically the contacts 12b serve to insure that the transfer operations by relay 12 take place before the clutch is energized to operate the rheostat contact 33a. More particularly the energizing coil 48 of the magnetic clutch 49 is short-circuited or by-passed by contact 12b until after operation of the relay 12. When relay 12 is deenergized the clutch coil 48 will discontinue the driving engagement before completion of the transfer from standardizing to measuring.

Now that the principles of the invention have been explained, it will be seen that variations may be made within the scope of the appended claims. For example, it is not essential that the resistor 59 be included in the charging circuit for the capacitor 58. Inclusion of that resistor is desirable where the source of supply for the capacitor is current-limited. The inclusion of the resistor 62 and the capacitor 63 is optional and the values thereof may be varied within relatively wide limits.

Instead of utilizing the contacts 12b to insure a proper sequence of operations as between the magnetic clutch 49 and the relay 12, there may be included as shown in Fig. 2 in series with the coils a glow-discharge tube 67 of the neon or like type. Again referring to Fig. 2, a cam 56 driven by a timing motor 66, which may be of a synchronous type, operates the switch 57 from its charging position to the standardizing position. As condenser 58 discharges through resistor 62 to charge condenser 63 there will be a rise in voltage across condenser 63 and the glow-discharge tube 67 until the latter attains its critical ignition value. The tube thereupon fires and current flows through the coils 12d and 48. The transfer from measuring to standardizing takes place simultaneously with the clutching of the rheostat to the balancing motor. The voltage continues to supply current to the coils 12d and 48. When the voltage across tube 67 decreases to below the critical extinction voltage-value for tube 67, the coils 12d and 48 are deenergized. For shorter standardizing times, the drop-out current value for the relay 12 may be made greater than the minimum current flow for tube 67. The relay 12, upon deenergization or when it "drops out" transfers the circuits from standardizing to measuring and the clutch 49 is then released leaving the rheostat in its proper position for flow through the standardizing resistor 26 of exactly the amount of current needed to produce a potential difference equal and opposite to that of the standard cell 45.

In Fig. 2 a slight modification has been made in the pushbutton switch 65. It has been provided with an upper pair of normally closed contacts through which extends the charging circuit for the capacitor 58. When manually standardizing is desired this pushbutton is depressed, the effect of which is to open the charging circuit and to connect the capacitor 58 through the lower pair of contacts to the resistor 62 and thence through the glow-discharge tube 67 and the coils 12d and 48. By reason of the circuit which has just been traced it will be seen that the capacitor 58 will during manual standardization determine the length of the standardizing operation. This has advantages which may be desired in some instances. The operator upon depressing the switch 65 has no need to hold it closed for any great length of time, merely a few seconds during which time the standardizing will take place automatically.

In Fig. 3 there has been shown a system in which the single coil 12d not only functions to control the transfer contacts 12a and 12c but also is arranged directly to operate the clutch. This may be accomplished through a clutch shifting mechanism or as shown, the clutch may be of the type in which a disk 70 driven by the balancing motor 36 may be journaled on a shaft 36a. An arm 71 extends from a pivoted end for operation by relay 12. The arm 71 carries a second disk 72 to drive the rheostat shaft 33b. When the coil 12d is energized the transfer contacts 12a and 12c function to change the measuring circuit from its measuring function to a standardizing operation. The arm 71 is lifted to bring disk 72 into driving engagement with disk 70. The motor 36 in response to any unbalance voltage is thereupon energized to drive through disk 70 to disk 72 thence through shaft 33b to adjust the contact 33a of the rheostat 33. It is to be further understood the rheostat, like the slidewires, may be adjusted with the associated contact stationary.

In a typical embodiment of this invention the components may have the following exemplary values: Capacitor 58, 200 microfarads; resistor 62, 20,000 ohms; and the voltage of D. C. supply, 100 volts. With these values the decay time of the capacitor will be something on the order of 10 seconds, hence by selecting relay coil 12d and coil 48 the duration of the standardizing operation can be made to be anything up to 10 seconds depending upon the drop-out current values of the coils.

What is claimed is:

1. In a measuring system of the type including a rheostat and a battery for supplying current to a potentiometer with means for adjusting said rheostat to develop in the potentiometer a voltage having a value bearing a known relationship to that of a standard cell, the combination comprising a timer, a capacitor, electromagnetic means for initiating a standardizing operation, and means operable by said timer for connecting said capacitor in circuit with said electromagnetic means for initiating said standardizing operation, the length of said operation being determined by the time required for discharge of said capacitor to predetermined value.

2. Means for predetermining the length of a standardizing operation for a measuring system comprising a circuit controller having an operating coil and contacts for establishing standardizing circuits, a capacitor, means for charging said capacitor to a predetermined voltage, and means for disconnecting said capacitor from said charging means and for connecting it in circuit with said operating coil for operating said controller to an energized position and for maintaining it in that position until the charge on said capacitor is reduced to a value below that which will maintain said circuit controller in its energized position.

3. In a measuring system of the type including a rheostat and battery for supplying current to a potentiometer with means for adjusting said rheostat to bring said current to a known value, the combination comprising a capacitor, means for changing said capacitor to a predetermined voltage, electromagnetic means for initiating a standardizing operation, and means for disconnecting said capacitor from said charging means and for connecting it in circuit with said electromagnetic means to operate it to an energized position and for maintaining it in that position until the charge on said capacitor is reduced to a value below that which will maintain said electromagnetic means in its energized position.

4. The combination of claim 3 wherein a means is provided for energizing said electromagnetic means from said charged capacitor independently of said capacitor connecting and disconnecting means.

5. In a measuring system of the type including a battery and a rheostat for supplying current to a potentiometer with means for adjusting said rheostat to bring said current to a known value, the combination comprising a relay and an electromagnetic means serially in circuit with said relay for initiating a standardizing operation, a timer, a capacitor, means for disabling said electromagnetic means when said relay is deenergized, and means operable by said timer for connecting said capacitor in circuit with said relay and said electromagnetic means for initiating said standardizing operation by energizing said relay and releasing said disabling means to permit energization of said electromagnetic means, the length of said operation not exceeding the time required for discharge of said capacitor to a predetermined value.

6. In a measuring system of the type including a battery and a rheostat for supplying current to a potentiometer with means for adjusting said rheostat to bring said current to a known value, the combination comprising a pair of serially connected electromagnetic means for initiating a standardizing operation, one of said electromagnetic means including means for making electrical connections to initiate a standardizing operation, and the other electromagnetic means including means for making mechanical connections to said rheostat for said standardizing, a timer, a capacitor, and means operable by said timer for connecting said capacitor in circuit with said electromagnetic means for initiating the standardizing operation, the length of said operation not exceeding the time required for discharge of said capacitor to a predetermined value.

7. The combination set forth in claim 6 including sequencing means for producing energization of said mechanical-connecting electromagnetic means after the other of said electromagnetic means is energized.

8. The combination set forth in claim 6 in which there is provided a disabling circuit for shorting out the operating coil of said mechanical-connecting electromagnetic means, and means actuated by the energization of the other electromagnetic means for opening said disabling circuit for energization of said mechanical-connecting electromagnetic means.

9. The combination set forth in claim 7 wherein said sequencing means comprises a glow tube in series circuit with both electromagnetic means and which is conductive at a magnitude of current greater than that required for operation of said electromagnetic means.

References Cited in the file of this patent

UNITED STATES PATENTS

| | | |
|---|---|---|
| 2,404,891 | Schmitt | July 30, 1946 |
| 2,610,311 | Phillips et al. | Sept. 9, 1952 |
| 2,651,022 | Shelley | Sept. 1, 1953 |
| 2,657,349 | Williams, Jr. | Oct. 27, 1953 |